J. R. PEIRCE.
MACHINE FOR RECORDING OR LISTING ITEMS ON CARDS.
APPLICATION FILED AUG. 30, 1913.
1,248,902.
Patented Dec. 4, 1917.
15 SHEETS—SHEET 1.
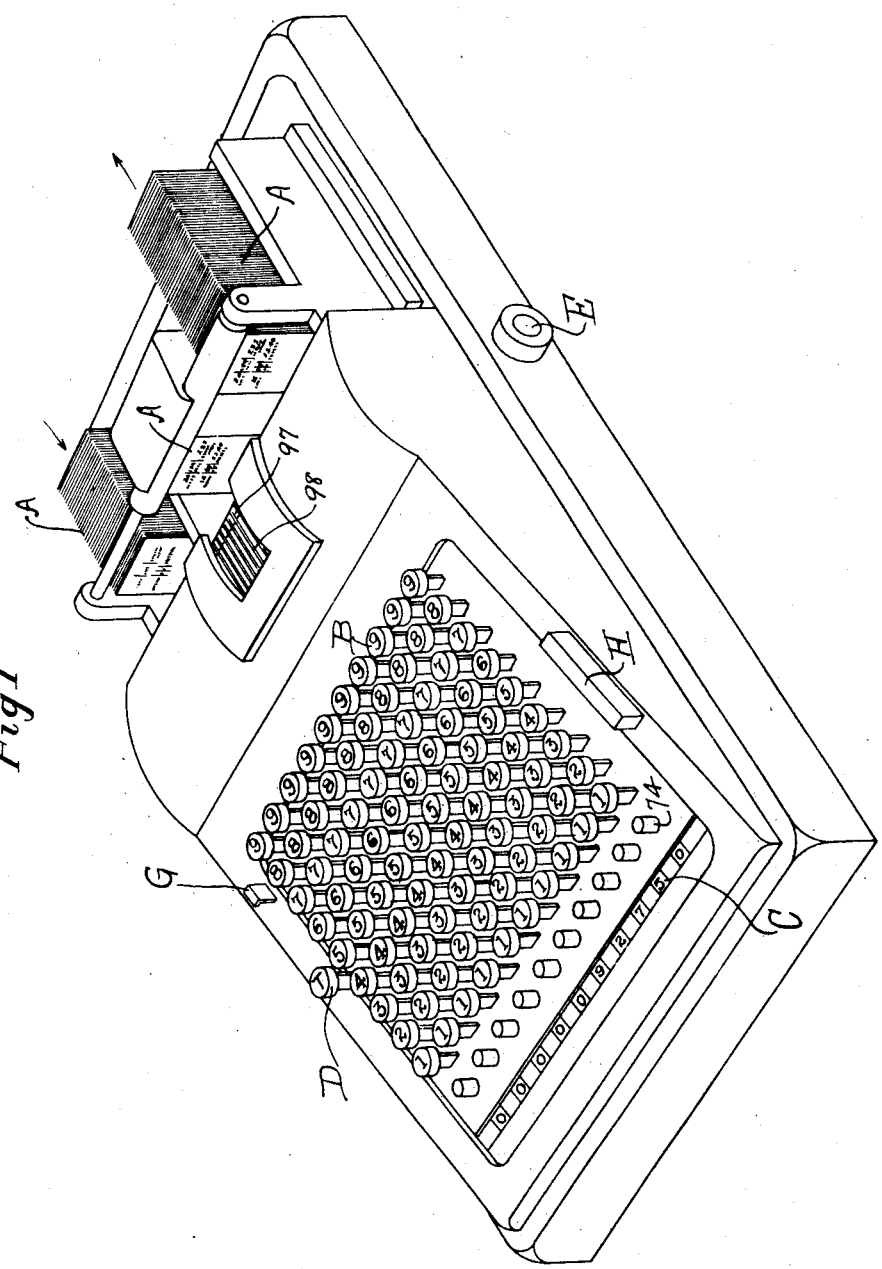

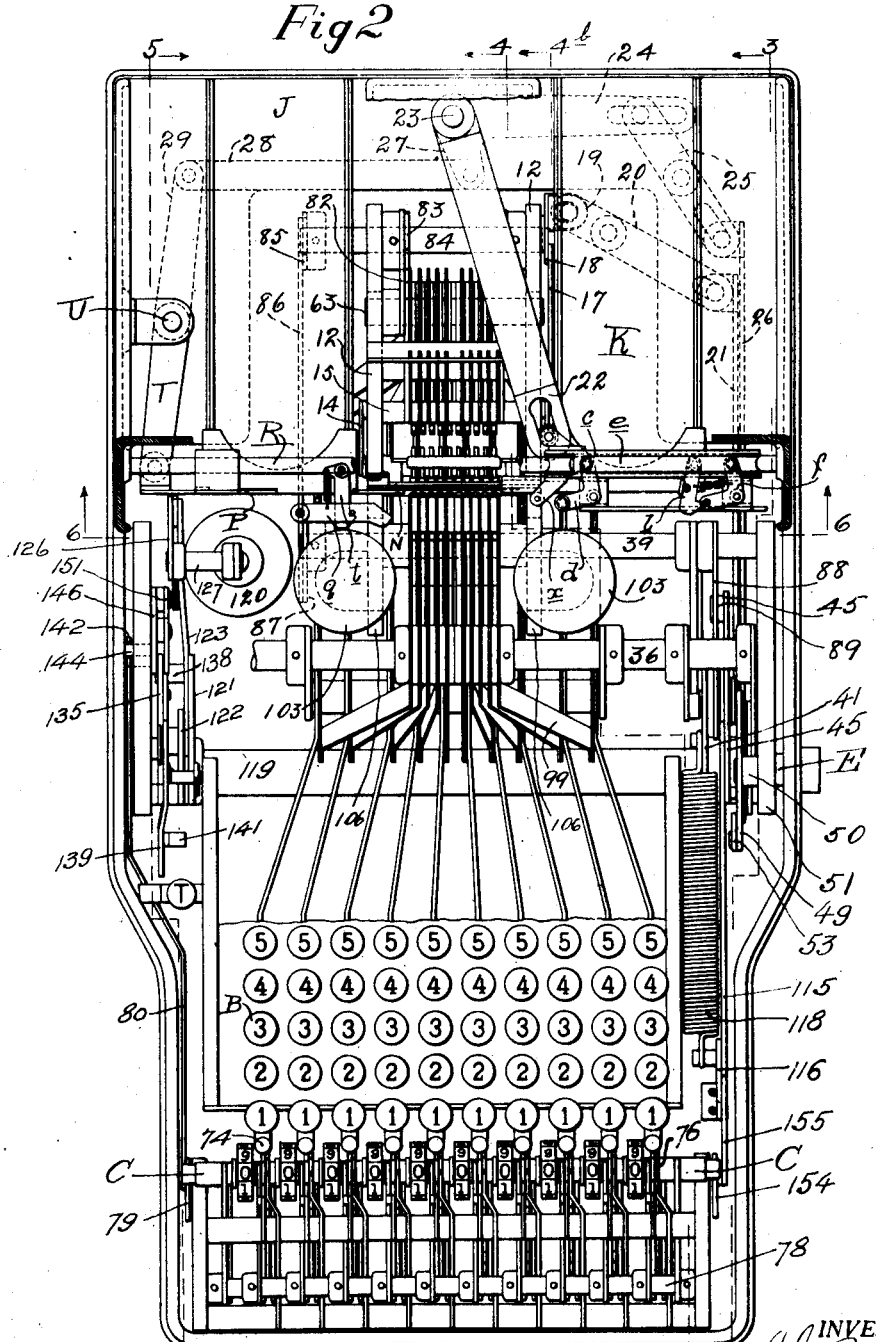

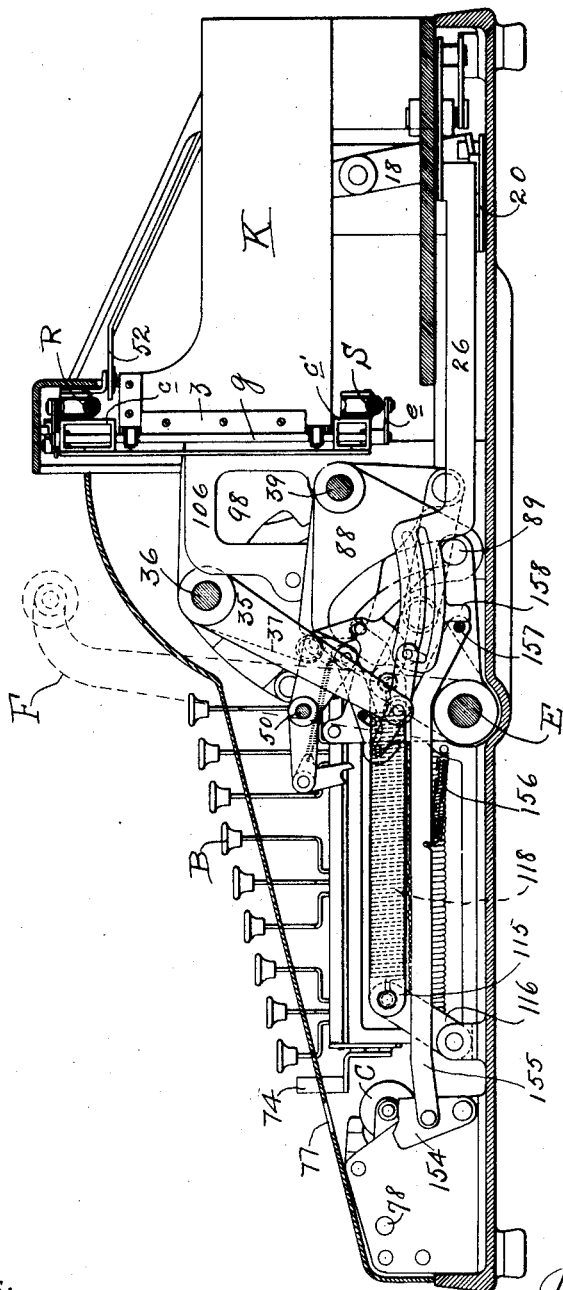

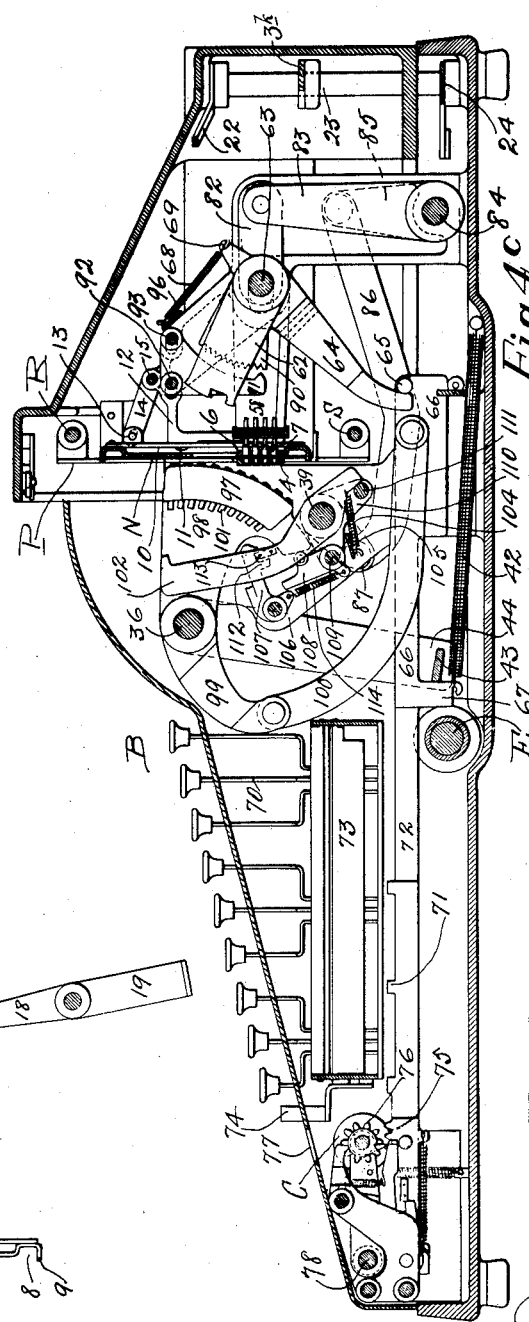

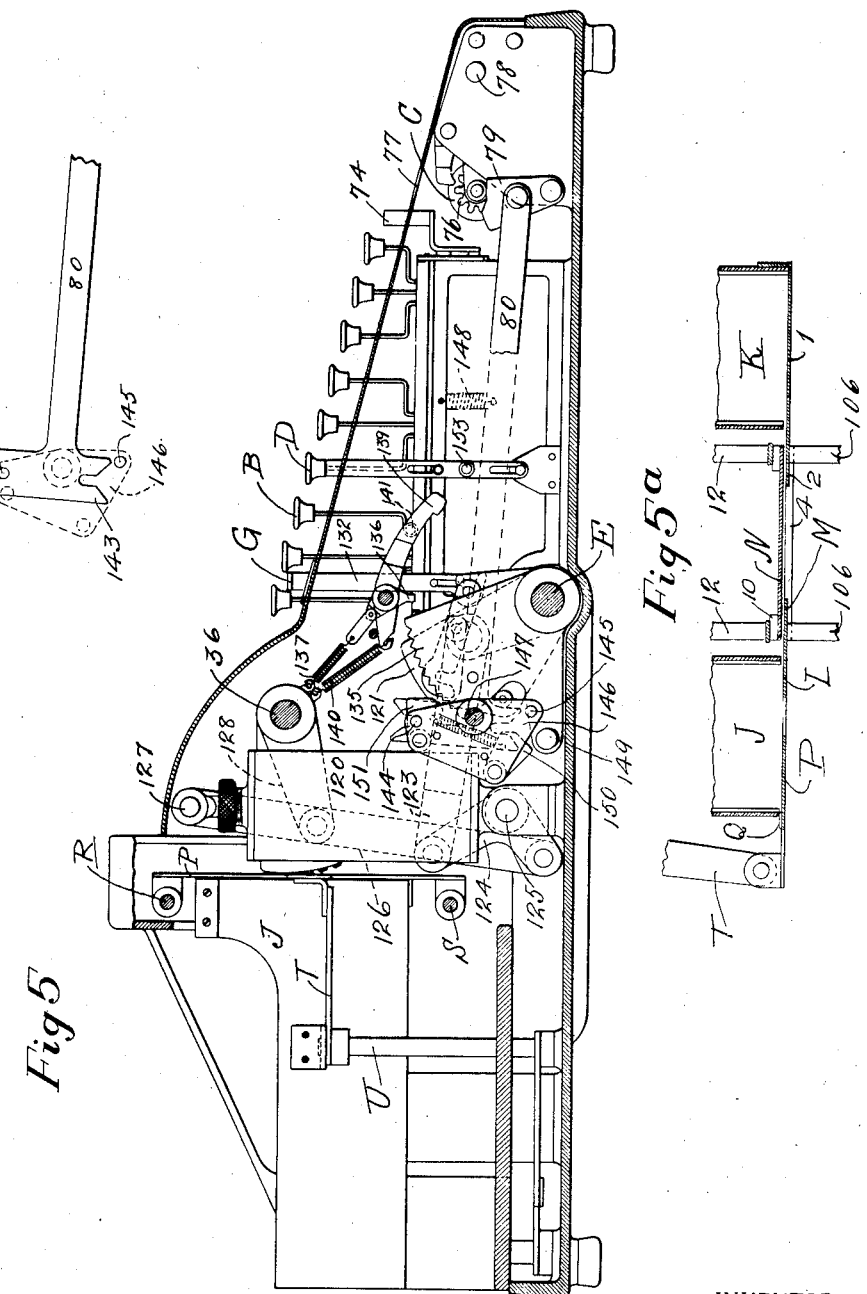

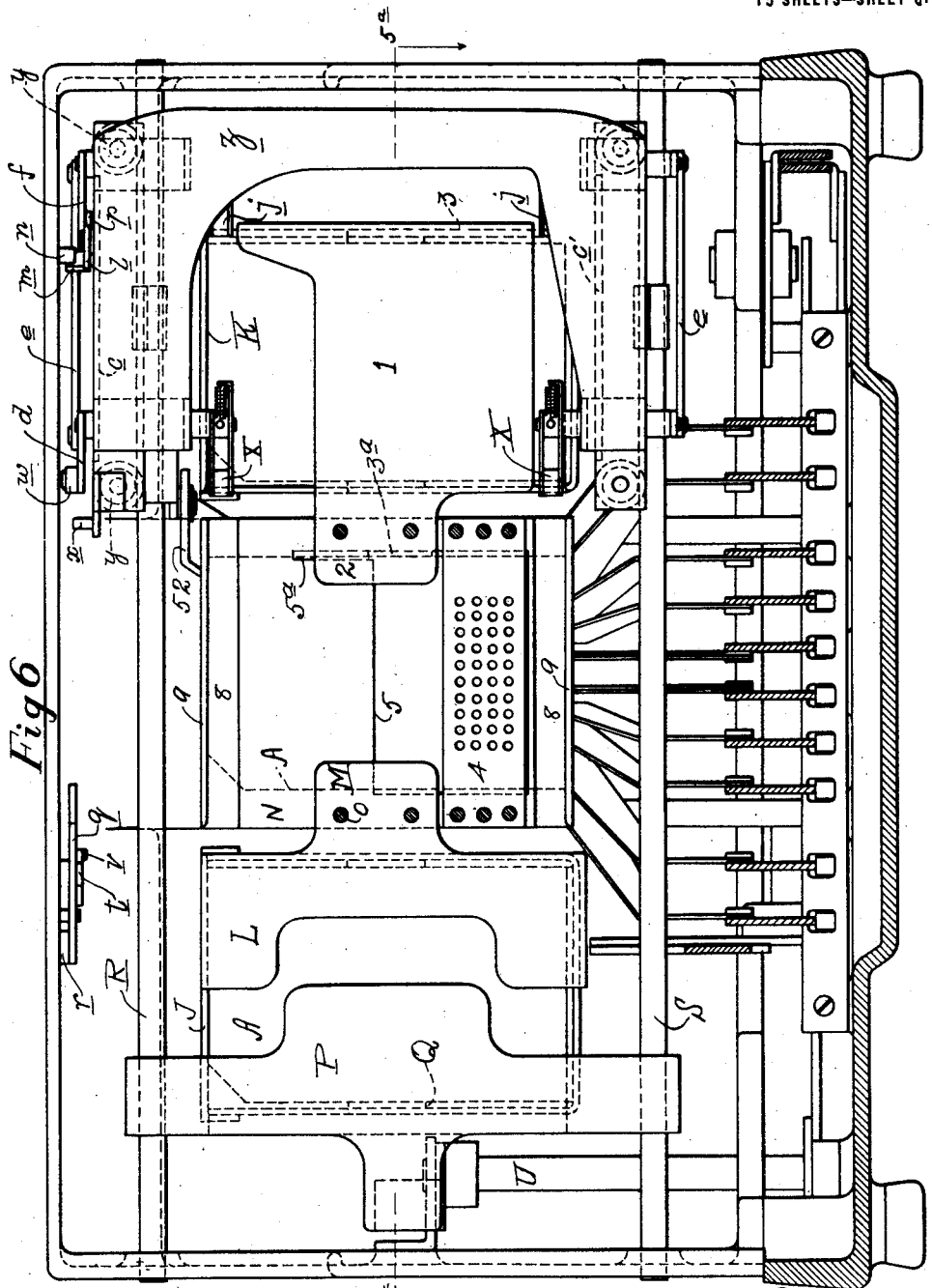

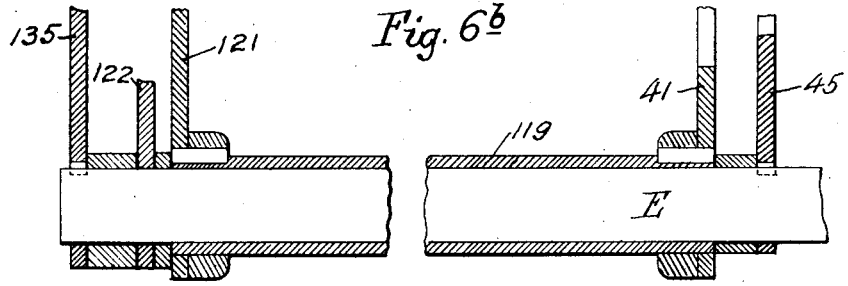
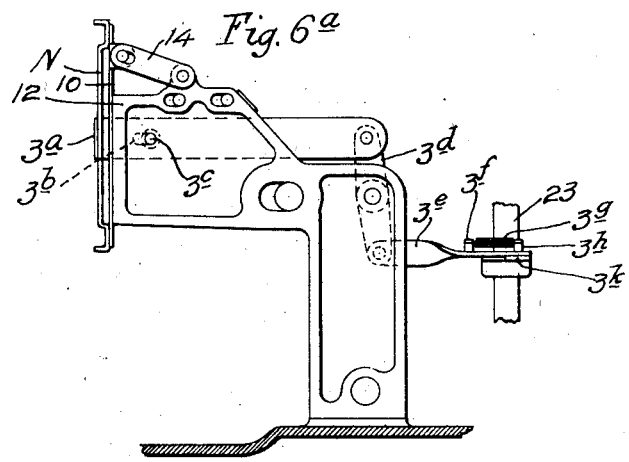

J. R. PEIRCE.
MACHINE FOR RECORDING OR LISTING ITEMS ON CARDS.
APPLICATION FILED AUG. 30, 1913.
1,248,902.
Patented Dec. 4, 1917.
15 SHEETS—SHEET 8.
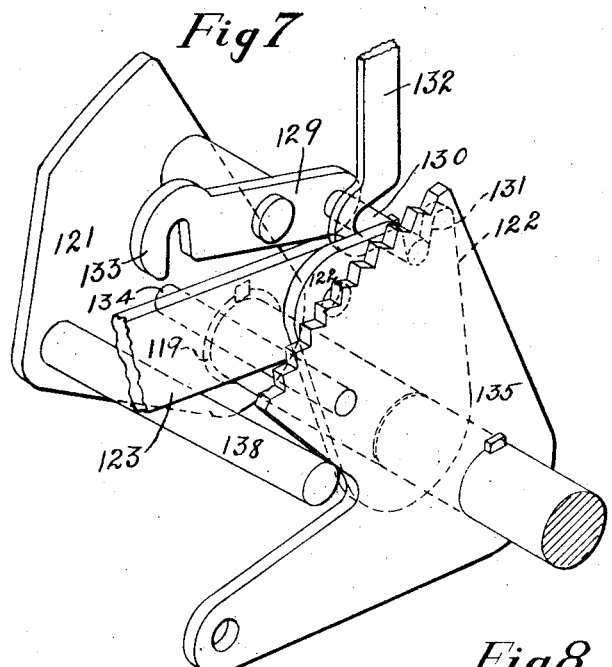
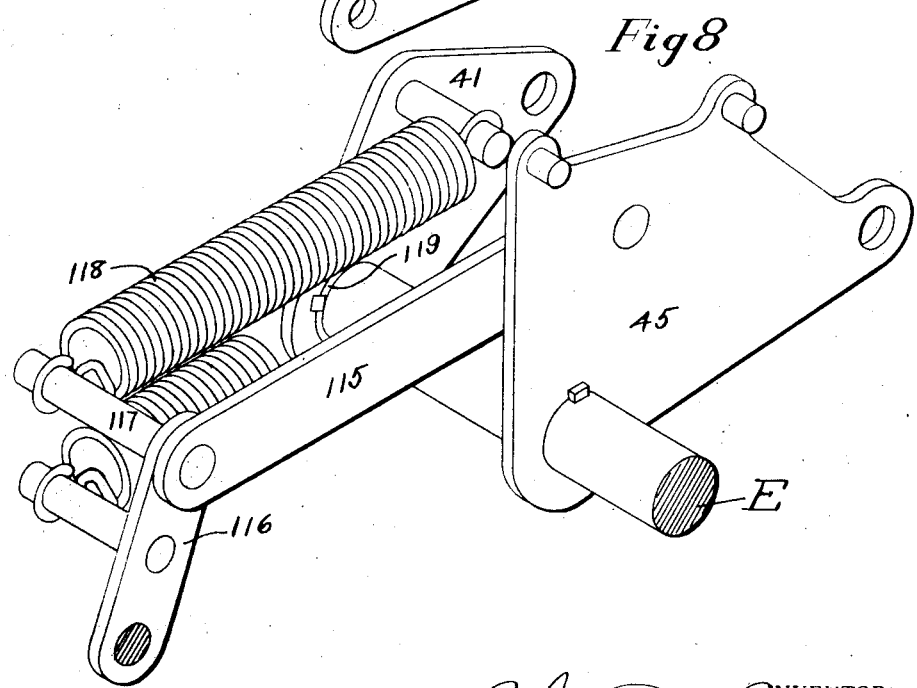

J. R. PEIRCE.
MACHINE FOR RECORDING OR LISTING ITEMS ON CARDS.
APPLICATION FILED AUG. 30, 1913.
1,248,902.
Patented Dec. 4, 1917.
15 SHEETS—SHEET 9.
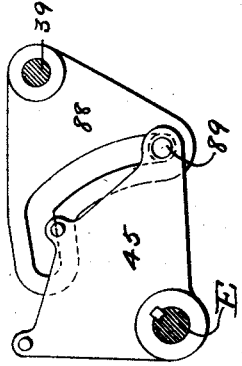
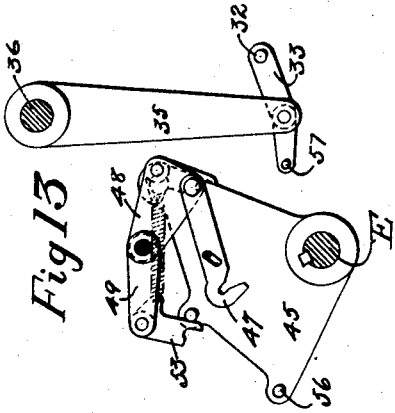
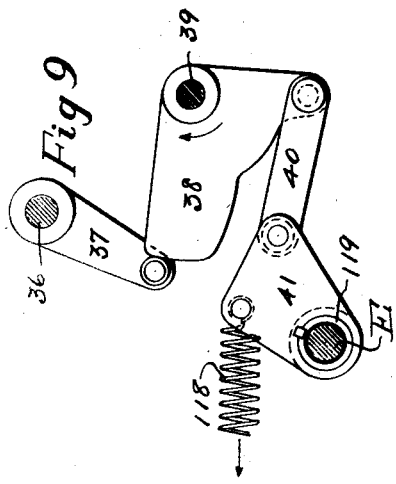
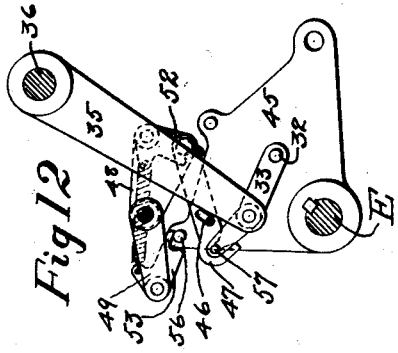
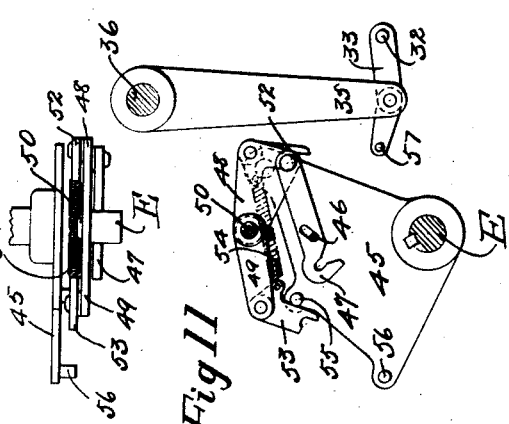
WITNESSES:
INVENTOR.
John Royden Peirce
BY
ATTORNEYS.

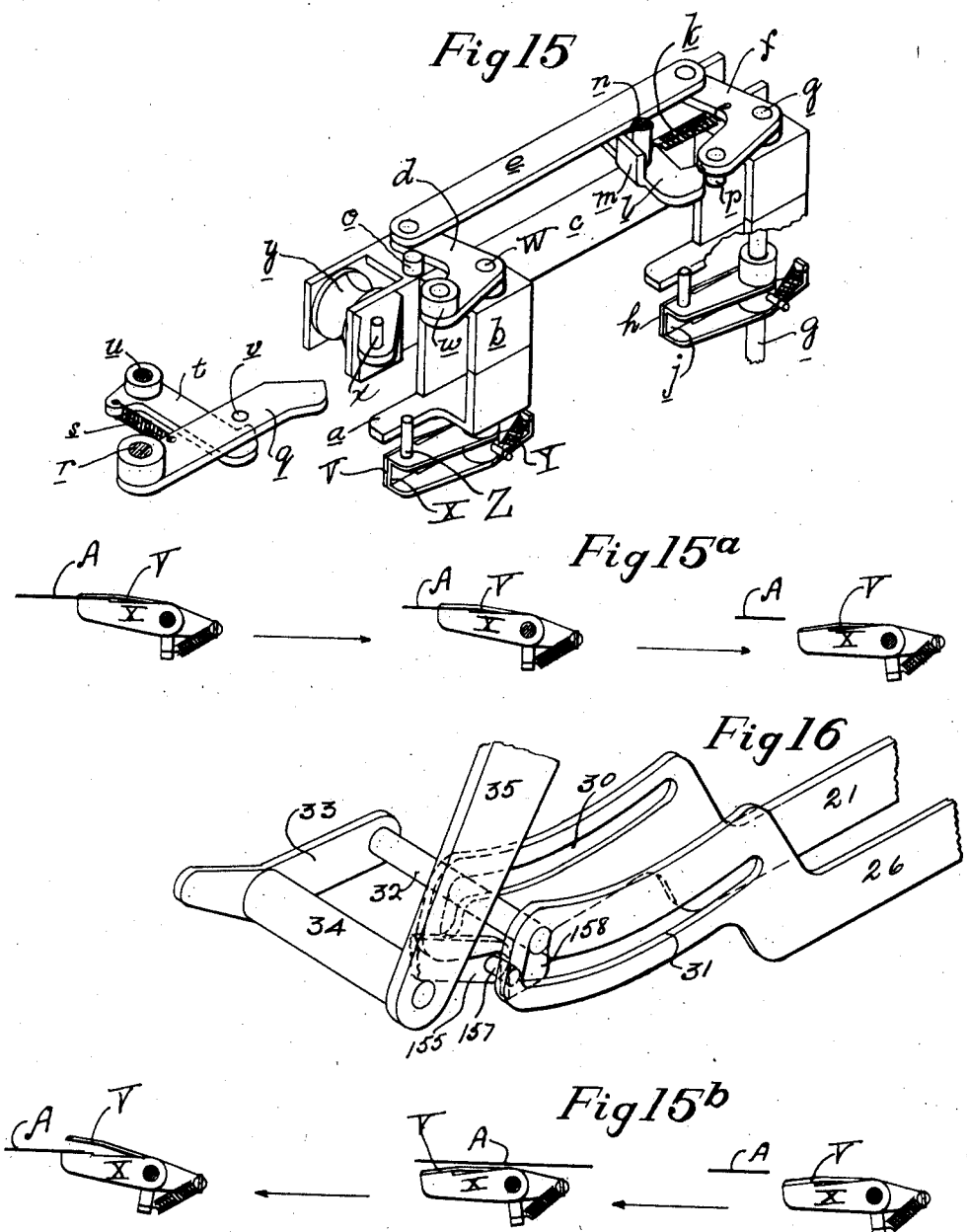

J. R. PEIRCE.
MACHINE FOR RECORDING OR LISTING ITEMS ON CARDS.
APPLICATION FILED AUG. 30, 1913.
1,248,902.
Patented Dec. 4, 1917.
15 SHEETS—SHEET 11.
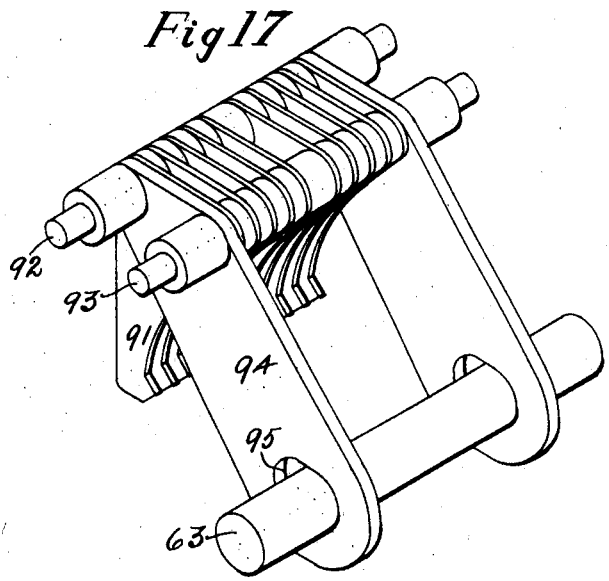
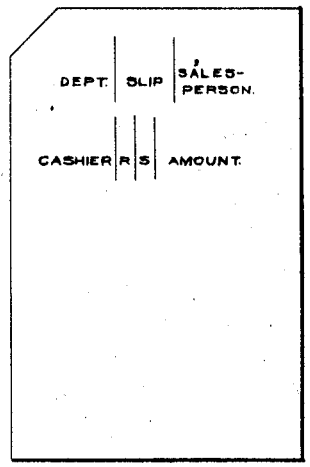
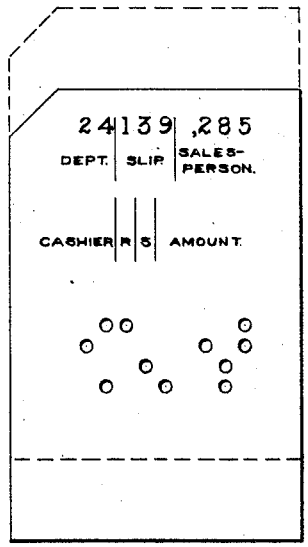
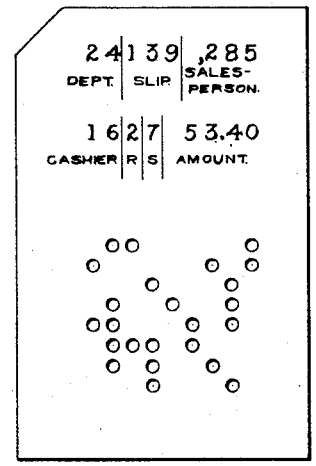
WITNESSES:
INVENTOR.
BY
ATTORNEYS.

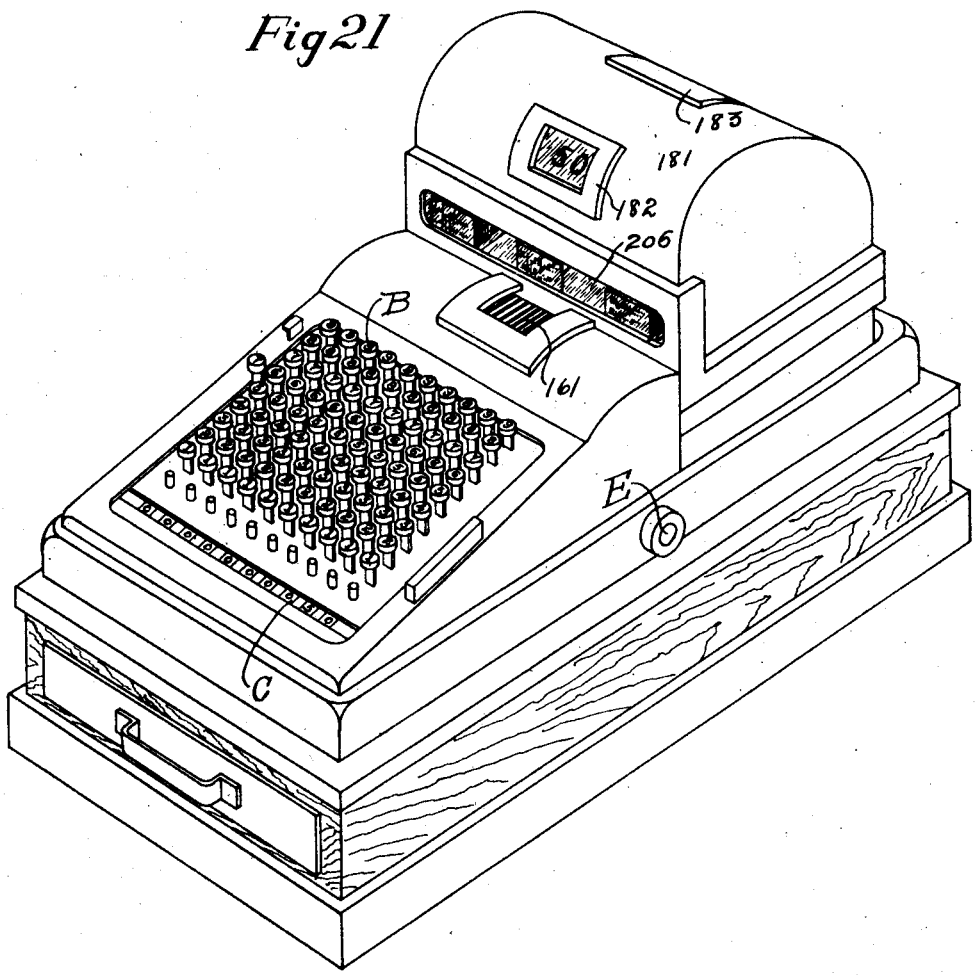

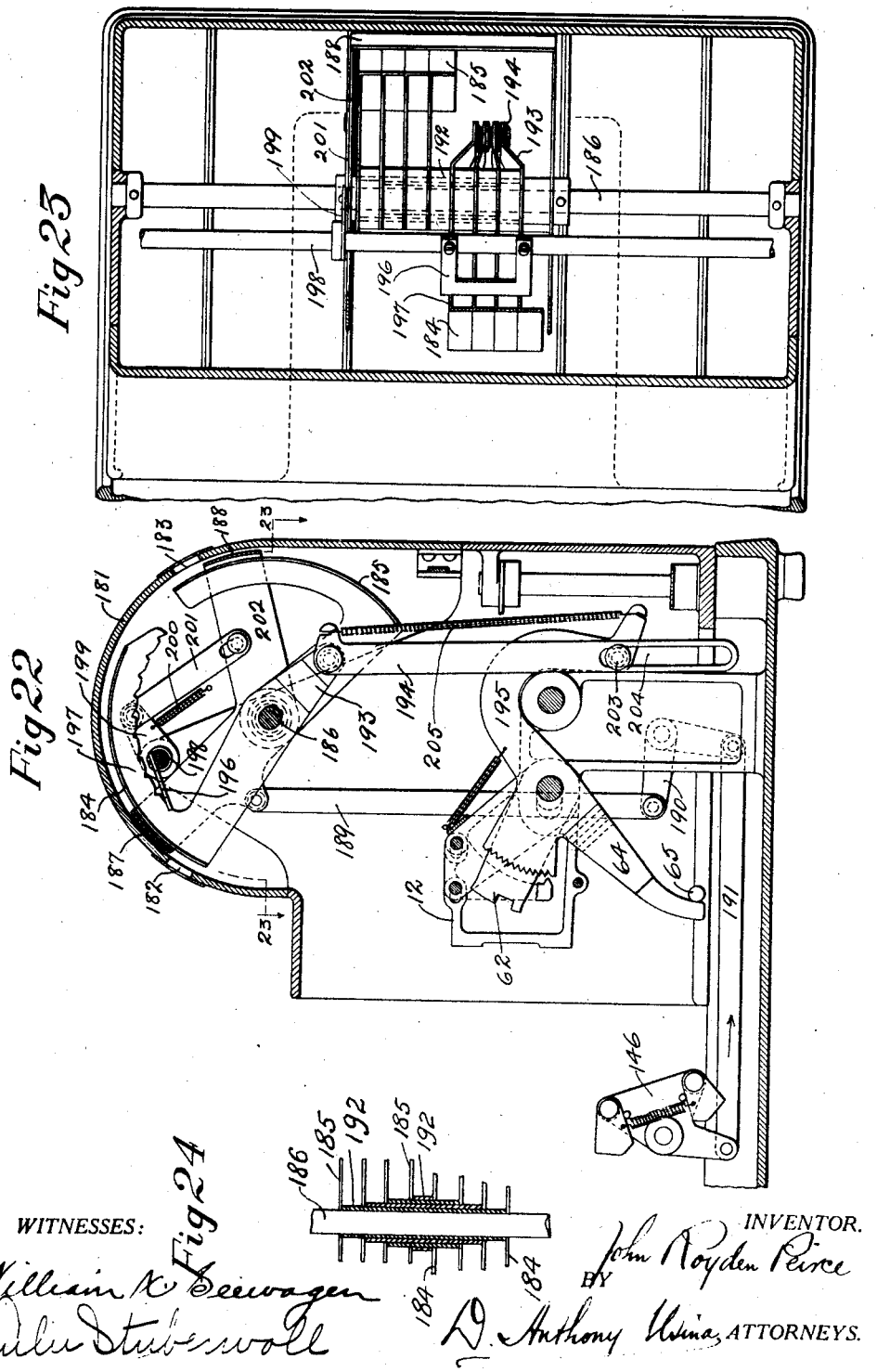

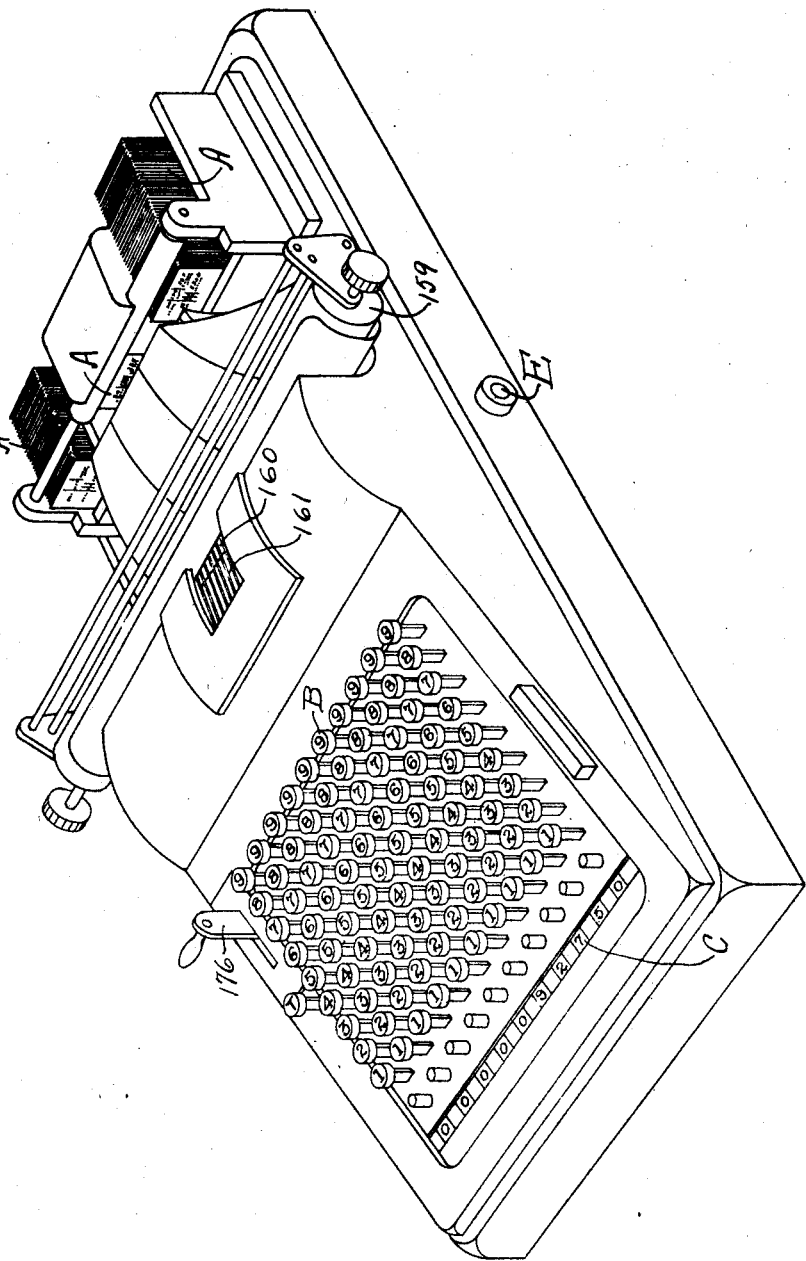

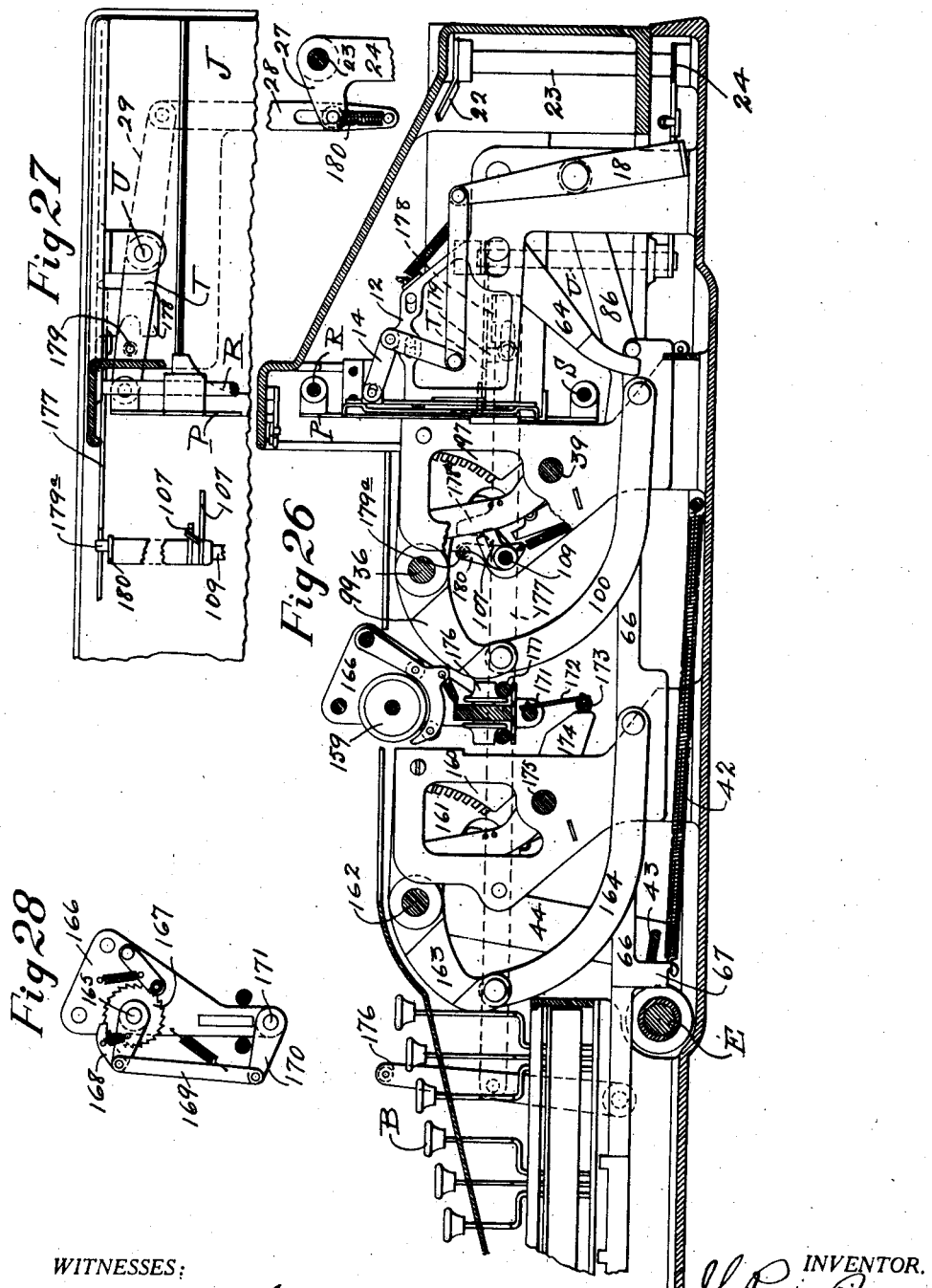

UNITED STATES PATENT OFFICE.

JOHN ROYDEN PEIRCE, OF NEW YORK, N. Y., ASSIGNOR TO PEIRCE PATENTS COMPANY, A CORPORATION OF NEW YORK.

MACHINE FOR RECORDING OR LISTING ITEMS ON CARDS.

1,248,902.  Specification of Letters Patent.  Patented Dec. 4, 1917.

Application filed August 30, 1913. Serial No. 787,456.

*To all whom it may concern:*

Be it known that I, JOHN ROYDEN PEIRCE, a citizen of the United States, and a resident of the city, county, and State of New York, have invented new and useful Improvements in Machines for Recording or Listing Items on Cards, of which the following is a specification.

In a previous Patent, No. 998,631 of July 25, 1911, I have described an apparatus for printing and punching cards which are to be used to control, through their perforations, the subsequent operations in accounting or statistical machines. In my pending application, No. 331,757, filed August 23, 1906, I have covered broadly a perforating and printing machine using separate and independent perforating devices, devices for printing on the card indications corresponding to the perforations and mechanism actuated by keys for controlling both a printing and a perforating operation. The present invention is a development, with certain modifications, of the machines described in said patent and said pending application.

In the aforesaid patent the system of perforations used in most of the columns of the card is a simple one, using a separate hole space for each of the nine digits. The present machine is designed to use only four hole spaces for the nine digits, some of the digits being represented by combinations of perforations in two or more of the spaces. This secures a much more compact card and machine; or permits the indicating of more information upon a card of given size.

The machine is of the key-board type and has an automatic feed for the cards. For each card the operator has merely to push the necessary keys, which sets the printing and perforating mechanism in corresponding positions, and then to pull the lever in order to operate the types and punches and to cause the automatic feeding of a new card as required.

An accumulator or total register is provided which is operated from the keys corresponding to a certain part of the card and which shows at all times the total of certain numbers applied to the cards. The machine may be operated by hand or by a motor. When it is to be operated by hand certain devices are provided for retarding and controlling the operation so as to prevent accidental injury to the machine, which precautionary devices are not necessary with a motor. According to the present invention means are provided for rendering these precautionary devices inoperative so as to permit the change of the machine from hand operation to motor operation.

The complete machine is accurate and easy and fast of operation. The accompanying drawings illustrate embodiments of the invention.

Figure 1 is a perspective view of the machine omitting certain details for the sake of clearness.

Fig. 2 is a plan with a part of the casing removed and part of the mechanism in horizontal section.

Fig. 3 is a longitudinal section approximately on the line 3—3 of Fig. 2.

Fig. 4 is a longitudinal section approximately on the line 4—4 of Fig. 2.

Fig. 4$^a$ is an enlargement of a part of Fig. 4, showing the construction of the punches and immediately related mechanism.

Fig. 4$^b$ is a side elevation of the mechanism for shifting the card vertically, the plane of this figure being approximately on the line 4$^b$ of Fig. 2.

Fig. 4$^c$ is a rear elevation of a backing plate for the card.

Fig. 5 is a longitudinal section approximately on the line 5—5 of Fig. 2.

Fig. 5$^a$ is a horizontal section through the fronts of the supply and delivery magazines and the parts immediately connected therewith, on the line 5$^a$—5$^a$ of Fig. 6.

Fig. 5$^b$ is a detail of Fig. 5, shown separately for greater clearness.

Fig. 6 is a vertical transverse section approximately on the line 6—6 of Fig. 2 omitting certain parts for the sake of clearness.

Fig. 6$^a$ is a side elevation of the mechanism for stopping the movement of the card in its recording position.

Fig. 6$^b$ is a transverse section showing the main shaft and plates carried thereby.

Figs. 7 and 8 are perspective views of details.

Figs. 9 to 13 inclusive are side elevations of details.

Fig. 14 is a plan of parts of Fig. 11.

Fig. 15 is a perspective view of a detail.

Figs. 15$^a$ and 15$^b$ are diagrams showing the clip in successive positions.

Figs. 16 and 17 are perspective views of details.

Figs. 18 to 20 inclusive are front elevations of a card in the successive stages of the operation.

Fig. 21 is a perspective view of the machine with a cash register attachment applied thereto.

Fig. 22 is a side elevation, partly in section, of the cash register attachment.

Fig. 23 is a plan of the same, partly in section.

Fig. 24 is a horizontal section of the dials and connections of the cash register attachment.

Fig. 25 is a perspective view of the machine of Fig. 1 with a listing attachment added thereto.

Fig. 26 is a side elevation, partly in section of the listing mechanism applied to the printing and punching machine.

Fig. 27 is a plan of a rear part of Fig. 26.

Fig. 28 is a detail of the mechanism for feeding the strip on which the list is made.

Referring now to the embodiment of the invention illustrated, the machine has at the rear pockets or guideways for the cards A, one at the left for receiving the blank cards containing printed titles of the different items which are to be recorded thereon, and one at the left for receiving the cards upon which the various numbers and amounts have been printed under the appropriate titles and which have been correspondingly perforated. A card is shown also in the middle position in which the recording operation takes place.

On the front portion of the machine is a key-board containing recording keys B from 1 to 9 (zero being recorded when no key is pressed). At the front of the key-board there is located an accumulator C which carries the total of certain numbers recorded on the successive cards. A total button D is arranged adjacent to the key-board which, when pressed, causes the printing of the total and causes the accumulator to return to zero so as to start a new total thereon. The main shaft E projects slightly at the right of the casing and may carry a handle F (Fig. 3) which is pulled forward and released for each recording operation. Or the handle may be removed and the shaft connected with a motor designed to oscillate the shaft at the proper rate. Adjacent to the key-board is a pull-up G which throws out of operation certain controlling devices which are necessary when the machine is operated by hand, but not when it is operated by motor. At the right of the key-board is a long button or strip H which is pressed to start the motor after the desired keys for any recording operation have been pressed.

*Card feeding.*—The cards A are introduced into the left hand pocket J (Figs. 2 and 6) and pressed forward by a weight, spring or other suitable device toward the front of the pocket. Fig. 18 shows the card at this stage. The foremost card in the pocket J is shifted to the center of the machine in the vertical plane of the recording apparatus and then downward to bring an upper portion thereof in line with the recording devices and the latter are operated to form the upper printed line thereon (the numerals 24, 139 and 285) and to form an upper set of perforations corresponding to said numerals. The card after receiving this first "line" of the record is indicated in Fig. 19. It is then lifted and a second line of records applied thereto consisting, for example, of the numerals 16, 27, and 53.40 and the corresponding lower set of perforations as indicated in Fig. 20. The system of perforations in four hole spaces to correspond with the numerals is fully described in my previous application No. 666,944, filed December 20, 1911, and others, and need not be further described here. Any system of combinations of either four or more hole spaces may be used. The position of the card for the recording of the second line is indicated in dotted lines in Fig. 19. The recording devices act always in the same horizontal plane so that by shifting the card downward the first line is recorded and by thereafter shifting it upward the second line is recorded below the first. From the dotted line position of Fig. 19 the card is shifted horizontally to the right and enters the front of the right hand delivery pocket K, forcing back the previous cards therein against a weight or spring or the like; whence the cards may be removed from time to time as desired.

In order to withdraw the foremost card from the supply pocket J it is first engaged at its left hand edge by a pusher which gives it a slight movement to the right after which its projecting edge is seized at the top and bottom by clips which pull it over to the middle position. There is a front wall L upon this pocket for preventing the cards from being pushed out, this front wall L having a projection M extending beyond the rear edge of the card in the middle position of the latter so as to hold it against a backing plate N which forms the platen against which the printing is done. The plate L, M is fastened to an intermediate frame by means of pins O projecting forward from the plate to stationary uprights 106 (Fig. 2). A similar pair of clips engages the right hand edge of the card which is in the middle position and simultaneously pulls it to the right into the pocket K.

The pusher P is illustrated in Figs. 2, 5ᵃ and 6. It overlaps the foremost card in the pocket J and is provided on its inner face with a projection Q of approximately the same thickness as a card and adapted, in the retracted position of the pusher, to engage the rear edge of the foremost card. The pusher is guided at top and bottom upon a pair of transverse rods R and S and is pivotally connected at its rear with a horizontal arm T on a short vertical shaft U which is oscillated at suitable intervals through connections at its lower end hereinafter described. This causes a movement of the pusher sufficient to slightly advance the foremost card to the right.

In this position the card is caught by grippers, the upper one of which is indicated in Fig. 15 and comprises an inner jaw V fixed on a short upwardly extending shaft W, and an outer jaw X pivoted on the same shaft and pressed toward the jaw V by means of a tension spring Y between a pin on the shaft and a tail on the jaw. A pin Z bears against a projection $a$ on a frame carrying the shaft W to limit the backward movement of the jaw X. The shaft W is carried in a horizontal projecting portion $b$ of the frame $c$, and the shaft carries at its upper end a lever $d$ which is connected through a link $e$ with a similar lever $f$ on the upper end of a shaft $g$ which carries the gripper $h$, $j$ which pulls the card from the recording position to the discharge pocket. Connected to the lever $f$ is a tension spring $k$ which connects it with a hook $l$ pivoted on the frame $c$ at its rear end and having a lug $m$ which in the retracted position shown in Fig. 15 bears against a fixed pin $n$ projecting downward from the top of the casing (see Fig. 6) so as to stretch the spring $k$. Thus in this position the link $e$ is pulled to the left and the shafts W and $g$ are turned to swing the clips toward the front of the machine. This movement of the link $e$ to the left is limited by the stop pin $o$ on the frame $c$. The bent lever $f$ carries a pin $p$ which in this position engages the end of the hook $l$ and holds the latter in retracted position after the frame carrying the grippers moves to the left and away from the pin $n$. Thus near the end of the right hand movement of the clips the pin $n$ causes them to be shifted forward beyond the plane of the cards and the pin $p$ holds them in this forward position during the left hand movement of the frame so as to avoid interference with the cards which have been fed. Near the end of the left hand movement the clips are shifted back to the plane of the cards and opened by means of cam mechanism supported from the top part of the casing of the machine. The cam $q$ is pivotally suspended at $r$ and pulled backward by the spring $s$ connected to an arm of a hook $t$ which is pivotally supported from the top of the casing by a pivot $u$ and the forward end of which engages a pin $v$ on the underside of the cam. The bent lever $d$ on the shaft W carries a roller $w$ which, near the end of the left hand movement of the frame, strikes the inclined face of the cam $q$ and is deflected to the rear. This turns the shaft W and the jaws V and $h$ of the clips backward to their extreme position. They are followed by the jaws X and $j$ until the latter are stopped by the pins Z striking the projections $a$; the jaws V and $h$ moving farther. Thus the clips are shifted back into the plane in which the cards are to be fed and are also opened to pass over the edges of the cards. The action of the arm also causes the pin $p$ to be swung backward, camming over the inclined end of the hook $l$ and passing a slight distance beyond the shoulder of the hook.

After the clips have been opened and shifted sufficiently far to the left to embrace the edges of the cards a pin $x$ on the clip-carrying frame strikes the hook $t$ and releases the cam $q$ which is forced outward by the spring $k$ acting on the roller $w$. The outward movement of the roller $w$ is stopped when the pin $p$ strikes the shoulder of the hook $l$. This outward movement of the roller $w$ is sufficient to swing the jaws V and $h$ forward sufficiently to grip the cards against the jaws X and $j$. The frame is then shifted to the right until near the end of its movement it strikes the pin $n$ and the previous operations are repeated. The cam $q$ when released from the roller $w$ is retracted by its light spring $s$, the pin $v$ camming over the oblique end of the hook $t$. Thus each clip works in the manner illustrated in Figs. 15$^a$ and 15$^b$ in traveling to the right and to the left respectively. In Fig. 15$^a$ the first position shows the card gripped at the extreme left. The second position shows the card still gripped by the gripper and in the same plane, this being the position of the card at the end of a feeding movement. In the third position the card has been stopped at the end of a feeding movement, but the clip V, X has moved to the right and by the action of the fixed pin $n$ has been swung forward out of the plane of the cards. In Fig. 15$^b$ the first position, at the right of the figure, shows the clip beginning its rearward movement. The second position shows it with the jaws V and X open just before reaching the edge of the card and the third position shows them still open and embracing the edge of the card.

The frame $c$ carries rollers $y$ which travel on the rod R, Fig. 6. A similar frame $c'$ is located immediately below the frame $c$ and connected thereto by a stiff plate $z$ so that the two frames move together, the rollers of the lower frame traveling on the rod S. The shaft $g$ which carries the right hand clip $h$, $j$ is extended downward into the lower frame $c'$ (see Fig. 3) where it carries a similar clip, and the lower clips are connected to each other by arms and links similar to the parts e, d and f shown in Fig. 15. Thus the lower clips and the upper clips partake simultaneously of the same movements. In shifting the card from recording position into the delivery pocket K the forward face of the card bears against a plate 1 with a portion 2 overlapping the card in the recording position, the plate 1 being attached to the right hand wall of the pocket K by a flange 3 shown in Fig. 3. The movement of the card is stopped by the right hand wall of the pocket K. After the card strikes this wall and is stopped the clips $h$, $j$ continue to move to the right and slip off the edge of the card before they are swung forward for the return movement.

The card in the recording position is similarly stopped by striking a stop $3^a$ (Figs. 6 and $6^a$) which is withdrawn to permit the advance of the card to the delivery pocket and which is thereafter immediately advanced to limit the movement of the next card to its recording position. The opening 5 in the card-holder N is provided with an upward extension $5^a$ to permit the card-holder to shift downward without interference from the stop $3^a$. This stop extends rearwardly from the card-holder and has a slot $3^b$ through which passes a headed pin $3^c$ fastened in the right hand supplementary frame 12 whereby the stop is held against the frame and guided to prevent longitudinal movement. The rear end of the stop $3^a$ is attached to the upper arm of a lever $3^d$ pivoted in the same frame 12 and carrying at its lower end a link $3^e$ which has a pin $3^f$ connected by a spring $3^g$ to a pin $3^h$ projecting upward through a slot in the link $3^e$ and mounted on an arm $3^k$ fixed on the vertical shaft 23 which effects the lateral shifting of the clips. As the shaft 23 swings to shift the clips and feed the cards from left to right the pin $3^h$ commences to put a tension on the spring $3^g$ and to push the stop $3^a$ forward; but the card which was in recording position is advanced over the end of the stop before the latter commences to advance. As the movement continues the stop is pressed forward with a light spring pressure against the card which is advancing over its end. As the card is advanced beyond the end of the stop the latter springs forward and stops the cards in proper position. On the return movement of the clips the pin $3^h$ shoves the link in the opposite direction and withdraws the stop.

In the recording position the card lies between the back plate N, previously referred to, and the forward perforated plate 4 which is fixed in the plane of the projections M and 2. The back plate N (Figs. 4, $4^b$ and 6) is provided with a wide slot 5 in which lies a fixed perforated plate 6 with its perforations registering with those in the front plate 4, and carrying the punches 7 (Figs. 4 and $4^a$). The front of the plate N is provided at top and bottom with grooves 8 in which the clips travel while advancing the cards and with forwardly projecting edges 9 which extend over the top and bottom edges respectively of the card in its middle position and by which the card is first lowered to bring its upper line in recording position and then raised to bring its lower line into recording position. Upon the back of the plate N, Fig. $4^c$ there are provided guide strips 10 which have slots engaging pins 11 on a supplementary fixed frame 12. The strips 10 have at their outer edges ears 13 connected by a pin and slot to arms 14 mounted at opposite ends of a shaft 15 fixed on said supplementary frame 12, and oscillated at suitable intervals.

The movement of the shaft 15 is secured by the following mechanism. On its right hand end (Fig. $4^b$) is an arm 16 which is connected to a link 17 extending rearwardly and attached to the upper end of a lever 18 pivoted at an intermediate point of its length and having at its lower end an ear 19 with a slot in which is located a pin on the end of a horizontal lever 20 pivoted at an intermediate point of its length and connected by a pin and slot at its opposite end to a link 21 which is operated through suitable intermediate devices from the main shaft E. On the first operation of this shaft the back plate N carrying the card is lowered and the first line of the record is made. On the second operation of the main shaft the back plate and card are raised and the second line of the record is made. An alternating mechanism is, therefore, necessary, so that the link 21 will be reciprocated on alternate operations of the main shaft.

The movement of the clips must also occur only upon alternate operations of the main shaft. On the first movement of the shaft the clips operate and advance a card to recording position. The clips continue their movement to a point beyond the plate N (Fig. 6) and the latter then moves downward and thus lowers the card for the first punching operation. The clips have no vertical movement. On the second movement of the handle the back plate N lifts the card for the second punching operation, but the movement of the clips is suppressed. On the third operation of the handle the feeding movements of the first operation are repeated, etc. The frame $c$ carrying the clips is connected by a pin and slot (see Fig. 2) to a horizontal arm 22 on the upper end of a vertical shaft 23 at the rear of the machine, the lower end of said shaft 23 carrying an arm 24 connected by a lever 25 to a link 26 running forward to a point adjacent to the hand shaft E. The link 26 is operated alternatively with the link 21 for securing vertical movement of the card. The vertical shaft 23 has also an arm 27 connected by a link 28 to an arm 29 on the lower end of the shaft U by which the movement of the pusher is secured.

The forward ends of the links 21 and 26 are illustrated in Fig. 16 and the controlling mechanism therefor in Figs. 3, 9 and 11 to 14. The forward end of the link 21 is provided with a slot 30 near its upper edge, the forward end of this slot being turned down. The link 26 is provided with a slot 31, the forward end of which is turned up. A pin 32 is carried on a lever 33 frictionally mounted on a shaft 34 on the lower end of an arm 35 which is fixed on a shaft 36 carrying an arm 37 (Figs. 3 and 9), the lower end of which has a pin bearing on a cam 38 which turns freely on a shaft 39 and which cam is connected by a link 40 with a plate 41 loose on the main shaft E, but partaking of the motion thereof in the manner hereinafter described. When the main shaft is turned forward the cam 38 turns upward and after a first idle movement permits the arm 37 to swing to the rear. A spring 42 (Fig. 4) is connected to certain slides hereinafter referred to, engaging a cross bar 43 which extends between the lower ends of arms 44 on the shaft 36. Thus when the cam 38 permits it the shaft 36 is turned so as to swing the arm 35 to the rear. The pin 32 being in the position of Fig. 16, this movement of the arm 35 pushes the link 26 to the rear and operates the pusher P and clips to feed the card laterally. During this movement the pin 32 moves freely through the slot 30 without action on the link 21 and vertical feeding plate N. At the next operation the pin 32 is swung downward while the arm 35 is in its forward position, so that as this arm swings to the rear it pushes back the link 21 and causes a downward movement of the plate N carrying the card, and on its return an upward movement of the same card, the pin 32 working freely in the slot 31 so as to have no effect on the link 26 and the lateral feeding mechanism.

The shifting of the pin 32 upward and downward on alternate operations of the shaft is effected by the mechanism of Figs. 3 and 11 to 14. The shaft E carries a plate 45. To the right of this plate is a pin 46 fixed in a supplementary frame 51 (Fig. 2) engaging an oblique slot in a hook 47 with a flaring mouth or notch, the hook being pivotally mounted on a plate or arm 48 which is connected with an opposite arm 49, the two being frictionally mounted on a pin 50 which is mounted in the supplementary frame 51. At the outer ends of the arms 48 and 49 are pivoted pawls 52 and 53 respectively connected to each other by a spring 54. On the right hand face of the plate 45 are pins 55 and 56 projecting into the plane of the pawls 52 and 53.

In the starting position (Fig. 3) the hook 47 is in the forward position relatively to the pin 46 and, by reason of the obliquity of the slot, is in its lower position. The pin 57 on the forward end of the lever 33 lies within the hook 47. Therefore, this pin 57, like the hook 47, is in its lower position, and the pin 32 at the opposite end of the lever 33 is in its higher position. During the first part of the forward stroke the cam 38 (Fig. 9) merely holds the shaft 36 stationary and the arm 35 as in Fig. 3, with the pin 57 in the hook 47. But during this first portion of the stroke the plate 45 swings to the front, the pin 55 swings the arm 48 upward and the hook 47 is pulled to its upper position (Fig. 11), carrying with it the pin 57 and depressing the pin 32 before the rearward movement of the arm 35 commences.

At the end of the first forward stroke of the handle the parts are in the position of Fig. 11. The arm 35 has swung to its rear position and carried with it the link 21, causing a downward movement of the plate N carrying the card. On the first backward stroke of the main shaft the arm 35 swings forward pulling the link 21 forward and raising the plate N and card. The end of this forward stroke is shown in Fig. 12. The pin 57 enters the hook 47. The plate 45 moves backward on this stroke without effect except to bring the pin 56 into the notch of the pawl 53.

On the second forward stroke the cam 38 is idle during the first part of the movement as before so that the arm 35 remains in the forward position with the pin 57 in the notch 47 while the plate 45 is swinging to the forward position and the pin 56, in passing from the position of Fig. 12 to Fig. 13, swings the arm 49 and the arm 47 downward and throws the hook 47 downward and lifts the pin 32. Thereafter the cam 38 comes into play and allows the arm 35 to swing backward to the position of Fig. 13. In this swinging movement the pin 32 operates the slide 26, pushing it backward and causing the clips and related parts to shift backward to positions for engaging the cards. On the return portion of the second stroke the slide 26 is pulled forward causing the clips to feed the cards to the right. At the end of this stroke the parts are again in the position of Fig. 3.

The third operation of the machine is, therefore, a repetition of the first, and the fourth operation a repetition of the second, etc. The recording operation takes place on each stroke.

*Punching mechanism.*—The punches 7 are mounted in the manner indicated in Fig. 4ª. Their heads lie normally in the perforations in the plate 6 to which they are retracted by means of the retracting plate 58 bearing against heads on the stems 59 of the punches, which stems are guided in a common plate 60 fixedly supported by the supplementary frame 12. When a punching operation is to take place the retracting plate 58 is first advanced to release all the punches, and after a punching operation this plate is retracted to withdraw the punches which have been advanced.

The punches are operated by a series of push plates or perforating sectors 62 one for each column of punches, the ends of said plates being notched as indicated in Fig. 4 so that as each plate is set in a higher or lower position relatively to the column it will select and advance the punches in various combinations of one or more according to the number which it is desired to record. These plates are mounted loosely on a horizontal shaft 63 at the rear and each plate has an arm 64 projecting downward and engaging a pin 65 on a slide 66, the forward end of which has a depending projection 67 connected to the spring 42 which tends to throw the slide always to the rear. The projections 67 on the several slides are all engaged by the cross bar 43 between the ends of the resetting arms 44 by which they can be restored to their starting point after a recording operation. When the arms 64 are released by the backward movement of the slides 66 the push plates are swung downward by the springs 68 connected to upwardly extending arms 69. The extent of downward movement of each plate is limited by the extent of rearward movement of its slide 66, this in turn being limited in accordance with the key B which is pressed.

The keyboard is similar in principle to the common adding machine keyboard, the keys having shanks 70 which when depressed extend into the paths of projections 71 on the extensions 72 of the several slides 66. When any key is depressed it is held down by a broad pawl 73, one for each column of keys. The pawl for any column may be pressed back to release the keys of that column by means of a button 74 at the lower end of the column. The construction is simplified as compared with the common type of keyboard mechanism, each of the slides being stamped complete out of a single strip of sheet metal and having the lower ends of the stems of the keys (which constitute stops for the projections on the slides) arranged in groups so that the number of projections 71 on each slide is less than the number of keys in a column, three such projections being used in the case illustrated for a column of nine keys. The first projection 71 is stopped by one of the first group of three keys so as to permit the slide to have a movement of one, two or three steps; the second projection by one of the second group of three keys, which are so located as to allow the slide a movement of four, five or six steps; and the third projection by one of the third group of three keys which are so located as to allow the slide a movement of seven, eight or nine steps.

The slides 72 extend forward and are provided at their ends with racks 75 which engage gears 76 through which the dials C of the accumulator are operated, the numbers on the edges of these dials being visible through the window 77. The dials and their gears are mounted in the frame which swings on the shaft 78. The forward movement of the handle lifts the gears out of engagement with their racks and they are dropped again into engagement before the rearward movement of the slides begins; so that they are advanced on the return movement of the slides 72. For throwing the accumulator gears out of engagement a cam 79 (Fig. 5) is provided engaging a roller on the left hand end of the frame which carries the gears, this cam being operated by a rod 80 which is controlled in the manner hereinafter described. The accumulator is of a well known type and need not be further described.

After the push plates 62 are swung down to the positions determined by the keys pressed they are advanced forcibly against their several rows of punches by the following mechanism. The shaft 63 has its ends supported in the supplementary frames 12 (see Fig. 2) and is connected near its ends to links 82 which are connected to the upper ends of arms 83 on a transverse shaft 84. The shaft 84 has at its left hand end an upwardly projecting arm 85 which is connected by a forwardly extending bent link 86 (Fig. 4) with an arm 87 on the shaft 39. This shaft carries near its right hand end a plate 88 (Figs. 3 and 10) having a cam groove into which extends a pin 89 from the plate 45 previously referred to. The shape of the cam groove is such that during the greater part of the forward movement of the handle and plate 45 there is no movement of the plate 88. Near the end of the forward movement of the plate, however, the pin 89 strikes the bent upper end of the cam groove in the plate 88 and swings the plate upward with a comparatively short and powerful stroke. This turns the shaft 39 to swing forward the arm 87 which through the link 86 and arm 85 turns the shaft 84 to throw forward the arm 83 and shaft 63 with the push plates 62.

The plate 58 by which the pins are retracted is bent backward at its right and left hand ends to form long flanges guided in grooves in the frames 12, the end of these flanges being connected to the ends of the shaft 63 so that they move forward and release the punches as the push plates are moved forward to actuate them, and are retracted to pull out the punches when the push plates are retracted.

In order to accurately center the push plates each of them is provided with a toothed plate 90 fastened to it and moving forward with it. In advance of this toothed plate is a frame, shown in detail in Fig. 17, comprising a corresponding number of toothed plates 91 suitably spaced and located so as to register with the several plates 90. They are mounted on shafts 92 and 93 which are guided horizontally in slots in the frame 12, the two shafts 92 and 93 being connected to arms 94 which at their lower ends are provided with horizontal slots in which lies the shaft 63 on which the push plates are mounted. The slots 95 in the arms 94 are sufficiently long to permit the toothed centering plates 90 to engage the plates 91 by a slight forward movement of the shaft 93 after which the frame carrying the plates 91 moves forward with the several push plates. The arms 94 of the centering frame carry also the plate 96 to which the upper ends of the push plate-setting springs 68 are fastened.

*Type mechanism.*—At the front of the card are located the types, those for each column being arranged in a printing sector or type carrier 97 moving synchronously with the corresponding perforating sector or push plate and mounted at the forward ends of levers 98, 99 (Figs. 2 and 4) pivoted at an intermediate point upon the shaft 36 and connected at their forward ends to links 100 which curve downward and to the rear and are pivotally connected to the several punch-controlling slides 66. In each column of the record, therefore, there is at the back of the card a column of four punches and in line therewith at the front of the card a carrier 97 containing the ten types from zero to nine. The types are indicated at 101. The type hammers 102 one for each column of punches are located in line with the upper portion of the card, and in the position of rest of the type sectors 97 their upper ends are close to the card while their lower ends curve away from the lower portion of the card and leave room for the punching devices at such lower portion. We thus secure a very compact arrangement of the recording devices, facilitating the use of a small card and the printing and punching of two or more lines on the card by shifting it vertically.

As the slides 66 move to the rear a distance depending on the key which is pressed, they swing their several type carriers 97 upward a corresponding distance to bring one or another of the types in each column in line with a hammer 102 which then strikes the type and causes it to print, through a ribbon, on the face of the card. The ribbon is carried on a pair of spools 103 (Fig. 2) but is not indicated in detail. The hammers 102 are separately pivoted on the shaft 39 and pulled toward the types by means of springs 104 attached at their forward ends to a plate 105 which extends from right to left between a pair of stationary plates 106 projecting upward from the base of the machine. These upright plates or frames 106 are in line with the frames 12 at the rear of the card and are the frames to which the guard plates L and 1 and the front perforated plate 4 are fixedly attached by the pins or rivets O (Fig. 6). Each hammer 102 has a laterally projection engaged by a pawl 107, each pawl overlapping the one of next higher denomination so that when any pawl is lifted all the pawls to the right thereof are lifted to permit all the hammers 102 to strike, but the lifting of any pawl has no effect on the pawls or the hammers to the left of it, such hammers being held locked by their pawls in the zero position; so as to avoid zeros at the left of any number. The zero type is at the top of each column and in line with the hammer in the position of rest of the machine. In this position a tail at the lower end of the lever arm 98 presses down a trip 108 which is pivotally mounted on a shaft 109 which is carried by plates 110 which carry also a resetting rod 111 bearing against the tails of the several hammers. The pawls 107 have projections 112 on their undersides just in the rear of the lateral projections 113 on the hammers. Each pawl 107 and its trip 108 have their tails connected by a spring 114 tending to throw the trip forward and to hold the pawl down.

Now whenever a type carrier moves upward one space or more it allows the trip 108 to swing to the rear until it is stopped by striking the lateral projection 113 on the corresponding hammer. It is then in line with the projection 112 on the underside of its pawl 107. Thereafter, as the punch plate is advanced the forward movement of the link 86 acting on the arm 87 turns the shaft 39 and with it the plates 110. This withdraws the resetting rod 111 from the tails of all the hammers and throws upward the trips 108. In any column in which the trip 108 has moved to position under the projection 112 the corresponding pawl 107 is lifted and the hammer 102 is snapped against the types by its spring. Also wherever any one of the pawls 107 is raised it insures the raising of all the pawls to the right of it by reason of the overlapping construction of these pawls so as to release all the hammers to the right of it and cause the printing of zeros as well as finite numbers. But where a type-carrier has remained in the zero position so as to hold the trip 108 in its forward position and where there has been no lifting of a pawl at the left hand the pawl in question is not lifted and the printing of zeros at the left of a number is suppressed. On the backward stroke, when the link 86 moves to the rear the resetting rod 111 swings back all the hammers which have been operated and the downward movement of the type-carriers 97 restores the trips 108 to their inoperative positions so that the parts again take the position of Fig. 4.

*Main shaft control.*—The movement of the hand lever or main shaft E is transmitted through a spring to the card feeding mechanism and the mechanism for setting the type-carriers and the punch hammers in position. (See Figs. 3, 8 and 9). The plate 45 which is keyed to the main shaft E is connected by a link 115 with an arm 116 pivoted near the front of the machine and carrying a pin 117 which engages the front end of a heavy coiled spring 118, the rear end of which is connected to a pin on the plate 41 which, as shown in Fig. 9, controls the cam 38 and the shaft 36. The plate 41 is mounted, not directly on the shaft E, but on a sleeve 119, the plate being keyed on the sleeve, and the sleeve being free to turn on the shaft E. See Fig. 6ᵇ.

The sleeve 119 runs nearly to the left hand end of the shaft and is connected to a dashpot 120 (Figs. 2 and 5) by mechanism shown best in Figs. 5 and 7. On the left hand end of the sleeve 119 is a plate 121 adjacent to which is a plate 122 mounted loosely on the shaft E beyond the end of the sleeve 119 and connected by a link 123 to a bell crank lever 124 which swings on the same pivot 125 which supports the dashpot, the other end of the bell crank being connected by an approximately vertical link 126 to the cross head 127 of the dashpot, the link 126 being connected also to a guide arm 128 swinging freely on the shaft 36. Pivotally supported on the plate 121 is a lever 129 carrying at one end a pin 130 adapted to enter a notch 131 in the edge of the loose plate 122, and to be thus connected to the dashpot. The pin 130 is engaged by a hook on the lower end of a rod 132 which at its upper end constitutes the "pull up" G for shifting from hand operation to motor operation. The rod 132 is shown in its lowered position, for hand operation.

To secure a motor operation it is desirable to cut out the spring 118 and the dashpot, the motor being operable with such regularity as to avoid the necessity of these devices. In that case the rod 132 is pulled upward, which swings the lever 129 and causes the hook 133 thereon to engage a rod 134 projecting inward from a plate 135 which is keyed directly on the main shaft. This connects the plate 121 rigidly with the main shaft E and thus the sleeve 119 and the plate 41 are also rigidly connected, so that when the shaft E is operated the plate 41 moves rigidly therewith and the spring 118 travels idly back and forth. At the same time the hooked rod 132 pulls the pin 130 out of the notch 131 of the plate 122 and thus disconnects the mechanism from the dashpot.

The plate 135 on the left hand end of the main shaft has a toothed edge which clicks past a pawl 136 (Fig. 5) which is held by a spring 137 in a middle position. In the rearward position of the handle the plate 135 is at the rear of the pawl. As the handle is pulled forward the notches click past the pawl and are engaged thereby so as to prevent a backward movement until the handle has first completed a forward movement, at the end of which the plate 135 can again be swung backward, pressing the pawl in the opposite direction so as to prevent a forward return until after the completion of the backward movement. This is, therefore, a double acting mechanism to prevent the making of an incomplete stroke in either direction.

On the forward stroke of the handle the shaft E carries the plate 135 (Fig. 7) forward faster than the plate 121, the latter being on the sleeve 119 which is pulled forward by a spring after the latter is stretched by the movement of the shaft. In order to prevent the spring from pulling the sleeve and connected parts forward too rapidly the plate 121 carries a pin 138 (Fig. 7) which bears against the rear edge of the plate 135 and prevents the sleeve from moving forward except as the shaft is moved forward in advance of it. It is necessary, as explained above, to set the printing and punching devices in position during the first movement of the handle by means of various devices connected with the sleeve 119, and to actuate the types and punches during the second part of the forward stroke, the actuating operations requiring a positive force and being, therefore, accomplished through direct connections to the shaft E. It is necessary, therefore, to insure a setting movement of the sleeve 119 before the second part of the forward movement of the shaft begins (in order to prevent actuating the types and punches before they are set). I, therefore, provide a spring-stop 139 (Fig. 5) held down by the spring 140 and lying in the path of the plate 135 and positioned so as to stop this plate at the end of the first or setting movement of the shaft until the sleeve which operates the setting devices shall have caught up with the movement of the shaft. As soon as the sleeve catches up sufficiently to complete the setting operations the plate 121 carried thereon strikes the roller 141 on the stop 139 and lifts the stop out of the path of the plate 135. When the handle is pulled at a normal rate the stop 139 will be lifted by the plate 121 in time to avoid any stoppage of the movement of the shaft. But when the handle is pulled forward too suddenly the stop 139 will act to prevent an improper operation. When the apparatus is set for motor operation the plates 135 and 121 are so connected to each other that the latter throws the stop 139 out of position at each operation before it can be struck by the plate 135.

*Alternating accumulator action.*—The ordinary mechanism for throwing the accumulator out of and into connection with the type setting slides is shown in Figs. 5 and 5ᵇ. The cam 79 when thrown forward lifts the accumulator gears out of connection with the type setting slides and when thrown toward the rear drops these gears into such connection. The link 80 is connected to the cam 79 and carries at its rear end a pair of forks 142 and 143 which are adapted to be engaged alternatively with pins 144 and 145 on a plate 146 which is pivoted on a stud 147 projecting from the left hand frame of the machine. Normally the link 80 is held upward by the spring 148 so that it is the upper pin 144 which engages a fork of the link. The plate 146 is rocked to throw the pin 144 toward the front of the machine at the beginning of each forward stroke of the handle and toward the rear of the machine at the beginning of each rearward stroke of the handle, the pin 145 being swung in the opposite direction at each movement. The swinging of the plate 146 is effected by means of a roller 149 carried on a projecting arm of the plate 146 and adapted to engage pawls 150 and 151 which are mounted on the plate 146 and are pulled toward each other by a spring and held by stop pins on the plate 146 as shown, so that these pawls yield in the outward direction, but not in the inward direction.

In the position of the parts shown in Fig. 5, as the handle is pulled forward the roller 149 moves upward and bears against the cam-shaped end of the pawl 150 and immediately swings the plate 146 so as to shift the link 80 and cam 79 forward and disengage the gears of the accumulator before the type setting slides receive any movement. As the upward movement of the roller 149 continues it clicks past the pawl 151 at the upper part of the plate 146. Then as the backward movement of the handle commences the roller 149 cams against the end of the pawl 151 and throws the plate 146 and pin 144 to the rear carrying with them the link 80 and cam 79 and dropping the accumulator into gear so that it partakes of the return movement of the type setting slides.

It is desired occasionally to print on a card the total registered on the accumulator. When this is to be done the accumulator is dropped into gear with the type setting slides and, none of the keys B being pressed, the type setting slides move to distances determined by the backward rotation of the accumulator gears 76 to their respective zero positions; the gear thereafter being thrown out of engagement with the slides so that at the end of the operation the accumulator stands at zero ready for the commencement of a new total. For taking the total, therefore, it is necessary to reverse the effect of the movements of the main shaft on the cam 79 and link 80 and this is done as follows. A push key D has a shank which carries a roller 153 adapted, when the key is pressed, to bear down on the link 80 and shift the latter so as to bring the lower fork 143 thereof into engagement with the lower pin 145 on the oscillating plate 146. This being done the regular operation of engaging and disengaging the accumulator will be reversed because of the movement of the pin 145 in opposite direction to that of the pin 144 which normally operates the link 80.

The present machine is designed to print in succession on two lines of the card and ordinarily only one number on one of these lines is to be impressed on the accumulator. In the card illustrated this number will be the "amount" indicated at the lower right hand corner of the card. The accumulator is operated only by the five slides at the right as indicated in the plan, Fig. 2, the dials at the left being actuated only from those dials which are operated by the slides, as the amount increases beyond five figures. Because of the fact that there is no figure in the first line of the card which is to be impressed upon the accumulator devices are provided for preventing an operation of the accumulator during the printing of the first line. See Figs. 3 and 16. Under the right hand end of the shaft of the accumulator gears is a cam 154 operated by the link 155 which is pulled to the rear by a spring 156 and which has at its rear end a pin 157 engaging a depending ear 158 on the slide 21 which controls the vertical shift of the cards. At the first operation of the machine when a card is shifted downward (to print on the first line) the slide 21 moves to the rear and permits the link 155 and cam 154 to move in the same direction thus lifting the accumulator out of gear and holding it so until the stroke is completed and the slide 21 returned to its starting position. Thus there is no addition to the total during the printing of the first line. On the next stroke of the machine the slide 26 controlling the lateral shift of the card is operated, but the slide 21 is stationary and thus holds the cam 154 in its forward position and permits the regular operation of the accumulator, so that the amount printed on the second line of the card is impressed on the accumulator.

*Listing attachment.*—In addition to the mere printing and perforating of the card and the accumulating of the total I may by a very simple mechanism, shown applied to the machine in Figs. 25 to 28, provide for the making of a list of the items recorded on the successive cards. This includes a platen 159 similar to the ordinary typewriter or adding machine platen and type carriers 160 and controlling mechanism, located between the card printing mechanism and the keys B. The type setting mechanism for the listing operation is substantially identical with that for printing on the card, the type carriers 160 being carried on plates 161 mounted on a shaft 162 and having arms 163 connected by links 164 to the slides 66 by which the card-printing types are set. The platen is given a rotary movement to feed the list upward line by line. The shaft 165 of the platen is mounted in side frames 166 and carries at one end a ratchet wheel 167 (Fig. 28) which is operated by a pawl 168 connected through a link 169 to an arm 170 on a shaft 171 which has depending arms 172 (Fig. 26) carrying a rod 173 against which bears an arm 174 on the hammer shaft 175 so that as the arm 174 swings downward and upward alternately the roller and listing sheet are advanced step by step. The carriage is shown as having rollers 176 mounted on rails 177 to permit lateral movement (by hand or otherwise) in case a wide listing sheet is to be used and the records are to be placed thereon in successive columns.

An attachment is provided whereby the machine may be used solely for making a list without simultaneously printing and perforating cards. For this purpose a handle 176 is provided at the left of the keyboard, pivoted at the lower end and connected at an intermediate point to a slide 177 running to the rear and carrying at its rear end a plate 178 normally lying at the rear of a pin 179 on the underside of the arm T which operates the pusher for starting the lateral feed of the cards out of the entrance pocket J. When the lever 176 and slide 177 are pulled forward, however, the notch in the plate engages the pin 179 and thus prevents any forward movement of the pusher P so that, although the clips may move backward and forward there is no card feed. In this construction the arm T is on a shaft U having an arm 29 connected by a link 28 to an arm 27 on the shaft 23, as before; but in order to permit the regular movement of the arm 27 while holding the arm T stationary a spring 180 is provided between the arm 27 and the link 28. Where the machine is used only for listing it is desirable also to avoid the usual sudden operation of the hammers for the card printing types. This is done by lifting the pawls 107 which normally hold the hammers until their springs have been sufficiently distorted and thus cause a sharp blow of the hammers when the pawls 107 are lifted. For preventing this action the slide 177 is provided with an upward projection 178$^a$ adapted when the slide is pulled forward to strike a pin 179$^a$ on the end of an arm 180 which is connected with the extreme left hand pawl 107. The forward movement of the slide, therefore, lifts the pawl 107 which, by reason of the usual overlapping construction of these pawls, lifts all the pawls to the right. Thus as the hammers are released they move slowly to position against the ends of the types, but do not strike a hammer-blow.

*Cash register attachment.*—By the addition of a suitable dial or dials in positions to be readily seen by the customer and salesman the machine may be used in the manner of an ordinary cash register at the same time that it is printing and perforating cards for the individual transactions. A machine so equipped is illustrated in Figs. 21 to 24 inclusive. A casing provided at the rear and marked 181 serves to carry the indicators which are rendered visible through front and rear windows 182 and 183 respectively. The dials or indicators 184 and 185, one for each decimal place of the number to be represented, are mounted to swing on a central shaft 186 and are connected to the punch-hammer setting devices of the corresponding decimal places. A pair of shields 187 and 188 are mounted on the ends of arms pivoted on the same shaft 186 and are connected by a link 189, a bell crank 190 and a link 191 with the plate 146 heretofore referred to so that on the forward stroke of the handle the link 191 is shifted in the direction of the arrow to bring the shields in position over the windows and so that at the beginning of the rearward stroke of the handle the link 191 is shifted in the opposite direction so as to remove the shields from in front of the windows.

The numbers shown at the two windows must read in opposite directions. Therefore, the left hand dial 184 is connected by an outer sleeve 192 to the right hand dial 185; the next dial 184 to the right being connected to the next dial 185 by a second sleeve, within the outermost sleeve 192; and so forth, as indicated in the sectional view, Fig. 24. Each of the dials 184 is connected by an arm 193 to a link 194 which is connected by a pin and slot to an arm 195 extending rearwardly from the arm 64 of the corresponding push plate 62 so that as the plate swings downward one or more steps the dial will swing a corresponding distance. The dials are held down until the next operation of the machine by means of a broad pawl 196 engaging toothed plates 197 on which the dials 184 are mounted, the pawl being mounted on the shaft 198 which carries at one end an arm 199 pulled down by a spring 200 and connected by a link 201 to an arm 202 of one of the shields. The arms 195 projecting rearwardly from the push plates are connected to the links 194 by means of pins 203 working in slots 204 of the links and by means of springs 205 connected to the upper ends of the links. When there is a return movement of the plates the arms 195 move downward, stretching the springs 205 and tending to return the dials to their zero positions (this being the position shown in the drawings). But the dials are held by the pawl 196 until the beginning of the next stroke and the closing movement of the shields 187 and 188, which closing movement forces up the link 201 and throws out the pawl 196, permitting the spring 205 to bring the dials back to zero.

The casing 181 which covers the cards is provided not only with the windows 182 and 183 for observing the indicators but also with a front opening 206 which is preferably glazed as indicated in Fig. 21 and which shows the upper portions of the cards in their several positions. The same sort of a casing may be provided to cover the cards in the simpler style of machine shown in Fig. 1, while permitting observation thereof. Thus the operator can read on the card the item which he has printed so as to observe its correctness and can at the same time note any failure in the proper feeding of the cards. For greater security the casing 181 may be locked so as to prevent the operator from removing any of the cards. When a complete set of cards has been perforated the person in control will then open the casing, insert a new stack of cards in the left hand pocket and close the casing again and turn the machine over to the operator. With the window 206 open, not glazed, the operator can stamp the face of any card which has been incorrectly printed so as to withdraw the same from the stack afterward, the correct numbers being printed on the succeeding card. At the same time the cards will be held so as to prevent withdrawal from the machine.

The listing attachment is located at the front of the card mechanism and the cash register at the rear thereof and it will be readily understood that both these attachments may be applied to a single machine without interference with each other. Various other modifications in detail and in the arrangement and combination of the parts may be made by persons skilled in the art without departure from the invention.

No claim is made herein to the punching or punching and printing means disclosed except as parts of the recording or listing mechanism as defined in the following claims.

What I claim is—

1. A machine of the class described including in combination means for taking cards from a stack and shifting them in succession automatically in one direction and means for shifting them automatically in a second direction transverse to the first and means for making a record on a card in each of a plurality of positions to which it is thus shifted transversely.

2. A machine of the class described including in combination means for taking cards from a stack and shifting them in succession automatically in one direction and means for shifting them automatically in a second direction transverse to the first, and mechanism for controlling said shifting means and causing their alternate operation and means for making a record on a card in each of a plurality of positions to which it is thus shifted transversely.

3. A machine of the class described having a receiving point for cards, a delivering point therefor and a recording position between said points, said machine including in combination, means for feeding a card from the recording position to the delivery point, means for feeding another card from the receiving point to the recording position and means for shifting the cards to a plurality of points in the recording position and holding them stationary in such points in order to make records on a plurality of lines in succession.

4. A machine of the class described including in combination a receiving pocket and a delivery pocket on opposite sides of a recording position, means for simultaneously feeding a card from the receiving pocket to the recording position and another card from the recording position to the delivery pocket, and means for shifting the card while in the recording position to a plurality of points and holding them stationary in such points so as to permit the making of a record thereon on a plurality of lines successively.

5. A machine of the class described including in combination, a push plate adapted to be set in various positions, means for advancing said push plate and means for locking said push plate in the position in which it has been set, said means comprising a toothed plate rigidly connected with the push plate and a second toothed plate normally slightly in advance and adapted to be engaged by the toothed plate connected with the push plate during the first part of the advance of the push plate and to be carried forward to maintain the lock during the further advance of the push plate.

6. A machine of the class described including in combination recording mechanism, slides adapted to move to successive positions to cause the recording of successive characters, keys and stops actuated thereby, controlling the movement of said slides, said slides each having a plurality of projections adapted to engage the stops to limit the movement of the slides, the projections on each slide being less than the number of keys with which it coöperates and the keys being divided into groups, each group coöperating with one projection on the slide.

7. A machine of the class described including in combination recording mechanism, slides 76 adapted to move through successive steps to cause the recording of successive characters, said slides being stamped of sheet metal each with a plurality of projections 71 on their edges and keys having their lower ends serving as stops adapted to be engaged by said projections to limit the movement of the slides, the lower ends of the stems of said keys being arranged in groups, the stops of each group being separated from each other by distances corresponding to one step of the slide, and the stops of each group being adapted to coöperate with one of the projections on the slide.

8. A machine of the class described including in combination, a main shaft, recording mechanism, yielding means for transmitting the movement of the main shaft to the recording mechanism when the shaft is to be worked by hand, and means for connecting said shaft unyieldingly to the recording mechanism so as to eliminate said yielding element when the shaft is to be operated by a motor.

9. A machine of the class described including in combination a main shaft, recording mechanism, yielding means for transmitting the movement of the main shaft to the recording mechanism when the shaft is to be worked by hand, a dashpot connected to said mechanism to limit the rapidity of its movement and means for connecting said shaft unyieldingly to the recording mechanism and for disconnecting said dashpot when the shaft is to be worked by a motor.

10. A machine of the class described including in combination a main shaft, recording mechanism, a plate which is connected to said recording mechanism and is connected by a spring to said main shaft so that as the latter is advanced the plate follows the shaft through the action of said spring and means for stopping the movement of the shaft at a certain point until the plate is advanced to a certain extent and then permitting the continued movement of the shaft.

11. A machine of the class described including in combination a main shaft, recording mechanism, a plate which is connected to said recording mechanism and is connected by a spring to said main shaft so that as the latter is advanced the plate follows the shaft through the action of said spring, said plate being adapted to set the recording mechanism in position during the first part of the movement of the shaft and said shaft being adapted to operate the recording mechanism during the latter part of the movement of the shaft, means for stopping the shaft at the end of the first part of its movement, said stopping means being withdrawn by the completion of the setting movement of the plate so as to permit a further movement of the shaft.

In witness whereof, I have hereunto signed my name in the presence of two subscribing witnesses.

JOHN ROYDEN PEIRCE.

Witnesses:
D. ANTHONY USINA,
LULU STUBENROLL.